Nov. 27, 1923.

D. BOURQUE 1,475,787

MACHINE FOR DRILLING BUTTONS

Filed Aug. 7, 1916  8 Sheets-Sheet 1

Fig. 1.

Inventor:
David Bourque,
Attys.

Nov. 27, 1923.                                                    1,475,787
D. BOURQUE
MACHINE FOR DRILLING BUTTONS
Filed Aug. 7, 1916                               8 Sheets-Sheet 4

Nov. 27, 1923.

D. BOURQUE

1,475,787

MACHINE FOR DRILLING BUTTONS

Filed Aug. 7, 1916

Inventor:
David Bourque,

Nov. 27, 1923.

D. BOURQUE 1,475,787

MACHINE FOR DRILLING BUTTONS

Filed Aug. 7, 1916    8 Sheets-Sheet 7

Nov. 27, 1923.

D. BOURQUE

1,475,787

MACHINE FOR DRILLING BUTTONS

Filed Aug. 7, 1916     8 Sheets-Sheet 8

Inventor:
David Bourque,
by [signature]
Attys.

Patented Nov. 27, 1923.

1,475,787

UNITED STATES PATENT OFFICE.

DAVID BOURQUE, OF ROCKY HILL, MASSACHUSETTS, ASSIGNOR TO G. W. J. MURPHY COMPANY, OF MERRIMAC, MASSACHUSETTS, A CORPORATION OF MASSACHUSETTS.

MACHINE FOR DRILLING BUTTONS.

Application filed August 7, 1916. Serial No. 113,474.

*To all whom it may concern:*

Be it known that I, DAVID BOURQUE, a subject of the King of Great Britain, and a resident of Rocky Hill, Amesbury, county of Essex, and State of Massachusetts, have invented an Improvement in Machines for Drilling Buttons, of which the following description, in connection with the accompanying drawings, is a specification, like characters on the drawings representing like parts.

This invention relates to machines for drilling holes in small articles such, for example, as the button or head of a curtain fastener similar to that shown in the patent to Murphy No. 853,206, the purpose of the hole being to receive a spring-carrying pin or shank as shown in that patent. These heads are usually small brass castings and the purpose of my invention is to provide a machine that will handle such heads or buttons expeditiously and accurately position the holes in the same without attention from operatives.

My invention will be best understood by reference to the following description taken in connection with the accompanying drawings, wherein:

Fig. 2 is a section on the line 2—2 of Fig. 1, a few parts being omitted;

Fig. 3 is a detail of some of the parts shown in Fig. 2 to be hereinafter referred to;

Figs. 4 and 5 are sections on the lines 4—4 and 5—5 of Fig. 2 respectively;

Fig. 13 is a diagrammatic view similar to Fig. 2 with a number of parts in their proper relative position but with many of the supporting parts and other elements omitted;

Of the various figures, 2-8 inclusive, 10 and 13 are on twice the scale of Fig. 1; Figures 11, 15 and 16 on four times and Fig. 17 on eight times that scale; and Figures 9, 12 and 14 are on a scale proportioned to that of Figure 1 as three is to two.

Figure 1:
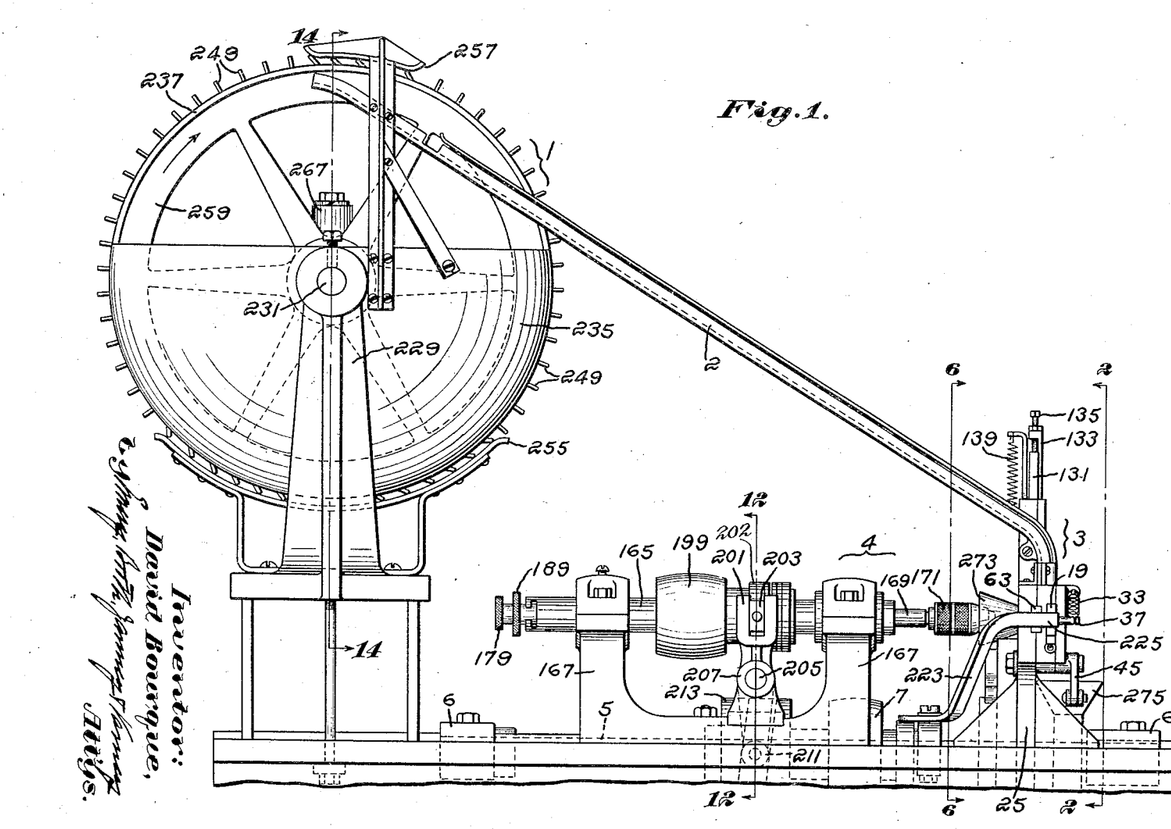
Fig. 1 is a general side elevation of one form of machine illustrating my invention.
Figure 9:
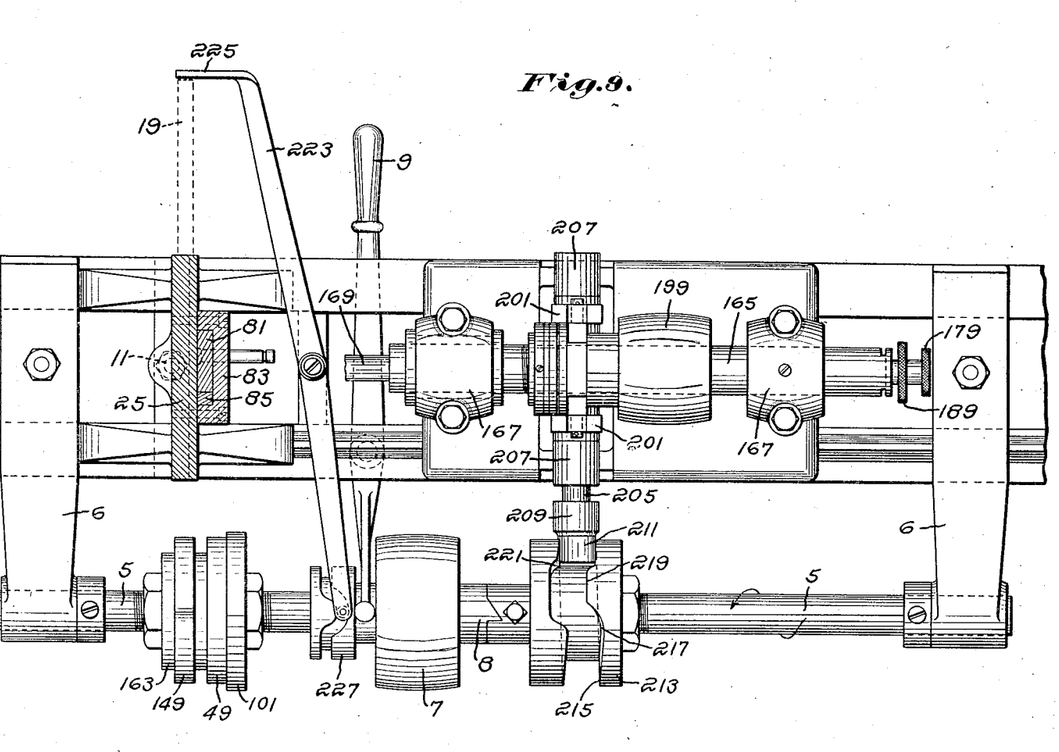
Fig. 9 is a top plan view partly in section of the right hand part of the machine as shown in Fig. 1.

In order to make more clear the structure and operation of the form of machine illustrated in these drawings, I will first, referring to Figs. 1 and 9, describe briefly and in a general manner the relation of parts and their function, disregarding for the moment the particular mechanisms illustrated. The form of machine shown embodies an assorting device 1 by means of which undrilled buttons are brought into proper position and delivered to the chute 2 which carries them to the head 3. The head 3 embodies a feed mechanism proper which delivers the buttons one by one into approximate axial alinement with the drill of the drilling mechanism 4 and a holding device or chuck embodying a number of jaws which take hold upon the button and retain it in position while the drill is acting thereon. The various mechanisms may be operated from a shaft 5 (see Fig. 9) supported in suitable brackets 6 from the frame of the machine at one side thereof and driven in any suitable way, for example, by the pulley 7 clutched thereto by the clutch 8 which may be manipulated by any usual form of clutch-shifting member such as the lever 9. On this shaft 5 to actuate the various parts of the mechanism there may be placed suitable cams, hereinafter to be more specifically referred to in their proper connection.

Figures 2, 3, 4, 5:
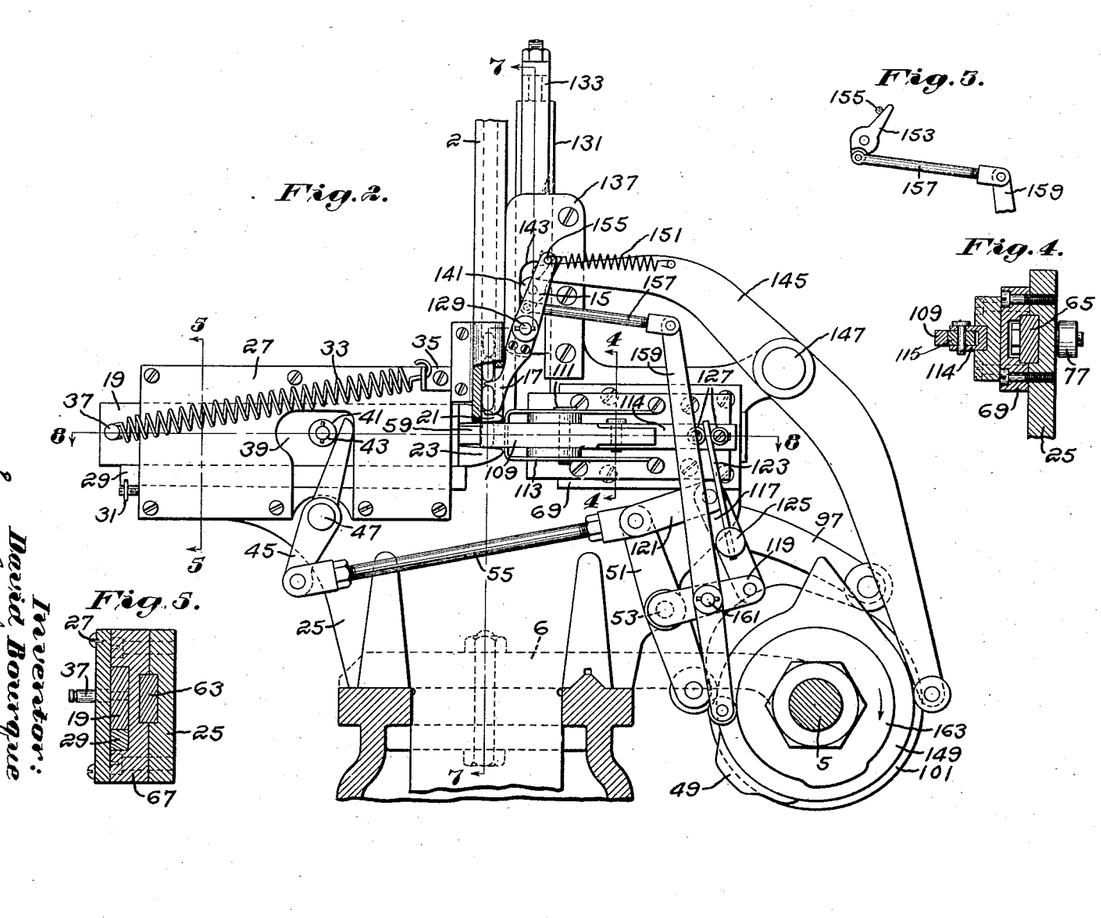
Figure 6:
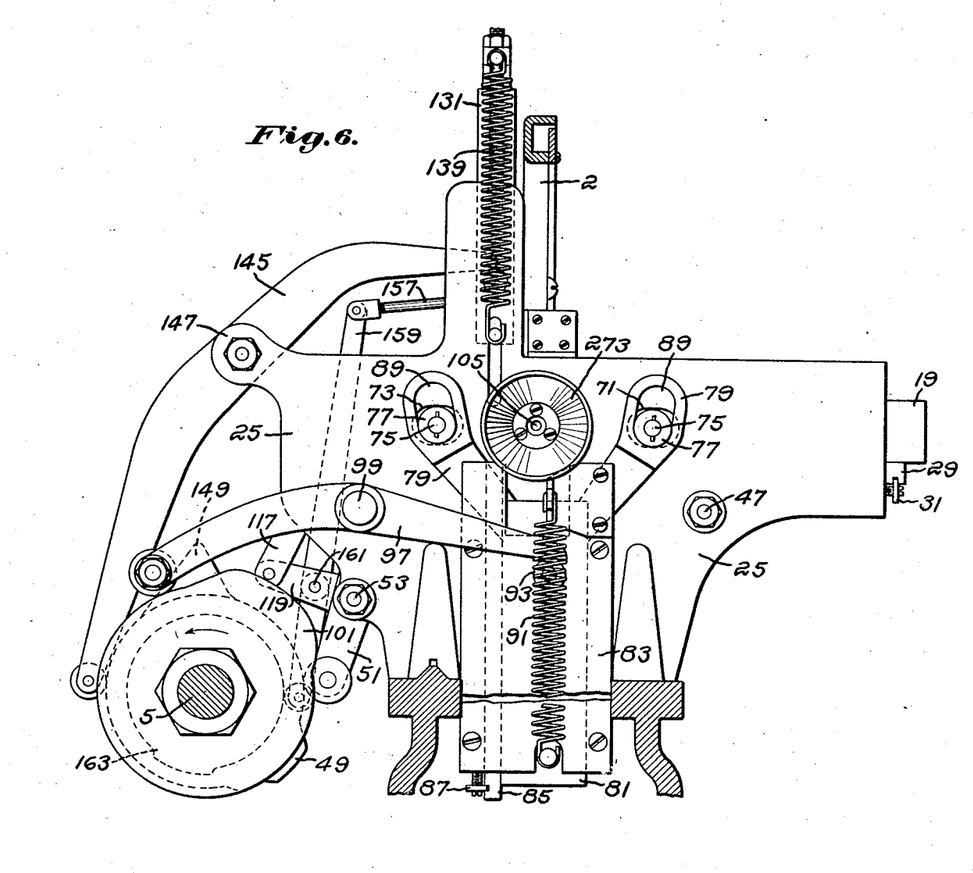
Fig. 6 is a section on the line 6—6 of Fig. 1.
Figures 7, 8:
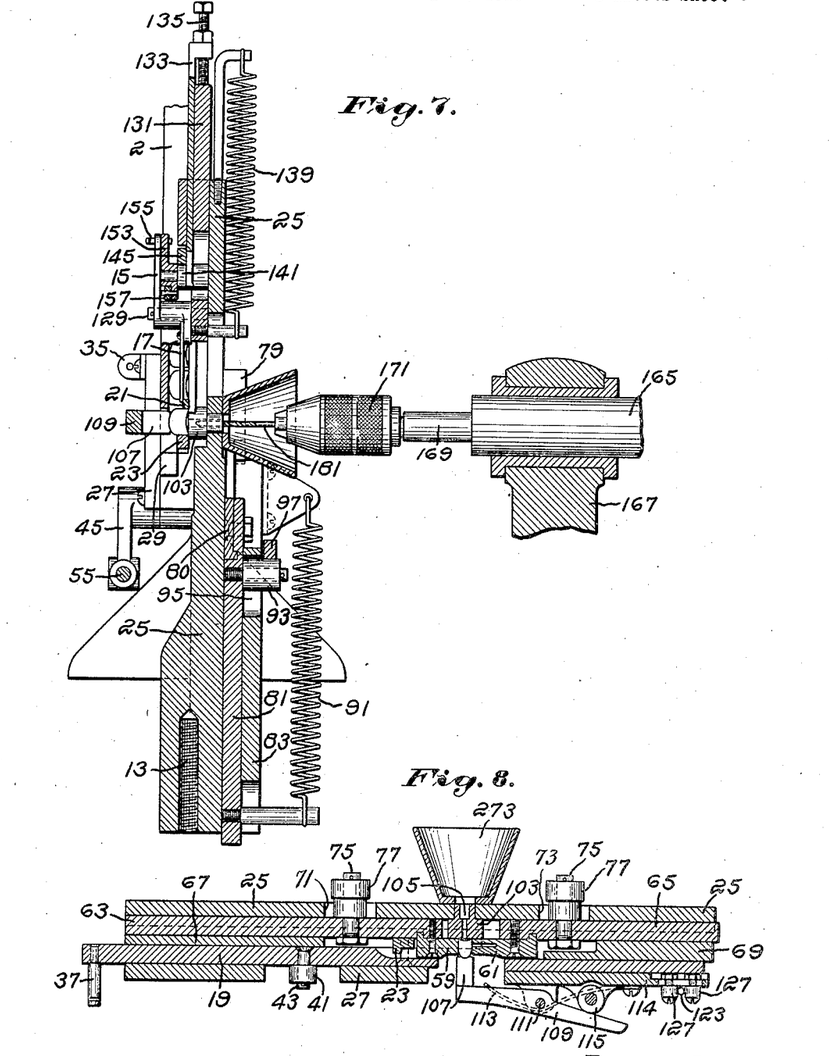
Figs. 7 and 8 are sections on the lines 7—7 and 8—8 of Fig. 2 respectively.

I shall next describe in a general way the structure of the head 3 which is preferably fixed to the frame of the machine as, for example, by the bolt 11 shown in Fig. 9 entering the hole 13 shown in Fig. 7. Referring to Figs. 2 and 6 which show opposite sides of this head, and Figs. 7 and 8 showing sections thereof, the buttons are delivered by gravity down the chute 2 and by means of a feeder arm 15 (Fig. 2) having a forked end 17 adapted to embrace the buttons, are fed one by one into a position in axial alinement with the drilling mechanism 4. As the feeder arm 15, details of the construction of which I will not now attempt to describe, releases a button in the position shown in Fig. 13, the button is seized by a system of holding jaws which center it accurately about the axial line of the drill, irrespective of small variations in size thereof, and hold it firmly in position while the drill is acting thereon.

I will now describe the holding members which, in the construction shown, seize on the button at the top and bottom, and in doing so I will refer to Figs. 2, 7 and 13. For this purpose I provide a slide member 19 having one end bifurcated to form upper and lower fingers 21 and 23. The inner faces of these fingers diverge slightly toward their outer ends and are symmetrically placed about a horizontal line. It is apparent that if these fingers are moved forward on opposite sides of a button presented thereto by the feeder arm 15 the button will be centered about the horizontal because of the equal and opposite inclination of their inner faces and held by the two fingers. While the two fingers are not in themselves independently movable, it is clear that their gripping faces have essentially a movement of approach and recession to and from the axial line of the drill where it intersects the plane in which they move above and below which they are symmetrically placed.

The slide member 19 is supported in a guide formed at one side of the main standard 25 of the fixed head 3 between cooperating plates 67 and 27 (see Fig. 5) and may be secured in position by a tapered member 29 adjustable by means of the screw 31 to take up any wear of the slide 19. A spring 33 extends from bracket 35 secured to the plate 27 to pin 37 on the end of the slide 19, and normally urges the slide inward so that the fingers 21 and 23 are in the position shown in Fig. 2. To move the slide in the other direction, the plate 27 may be cut away as shown at 39 to provide a space for the roll 41 mounted on the stud 43 carried by the slide 19. The roll cooperates with a lever 45 pivoted at 47 on the frame and operated from a cam 49 on the shaft 5 by any suitable means such, for example, as the lever 51 pivoted at 53 and the connecting link 55. When the lever 45 is rocked in a counterclockwise direction (Fig. 2) the slide 19 will be moved toward the left, and when the action of the cam ceases the spring 33 will retract the slide toward the right into the position shown in Fig. 2. It will be noted that by the mechanism described the slide 19 is moved inwardly with a yielding movement so that the stroke accommodates itself to variations in the size of the buttons which are delivered to the fingers 21 and 23 by the feeder arm 15.

I will next describe the jaws which, in the form of machine illustrated, seize the button laterally and for this purpose I will refer more particularly to Figs. 6 and 13, but also to Figs. 4, 5 and 7. The two jaws 59 and 61 (see Fig. 13) are mounted, if desired, by the tongue and groove joint shown in Fig. 8, on slide members 63 and 65 respectively, which slide in ways formed by the cooperation of the main standard 25 of the head 3 with suitable plates 67 and 69 (see Figs. 4 and 5). The main plate 25 is slotted as shown at 71 and 73 (Fig. 6) to accommodate the posts 75 projecting from the slides 63 and 65 and carrying rolls 77. The slides 63 and 65 carrying the jaws 59 and 61 are moved through the medium of these rolls by mechanism most clearly illustrated in Figs. 6 and 13. Cooperating with the two rolls are the two arms 79 of a yoke 80 (Fig. 7) fastened for example by a tongue and groove joint to a slide 81 movable in a vertical bearing 83. The slide 81 may be fitted into the bearing 83 by means of the wedge 85 and screw 87 (Fig. 6) similar to the wedge 29 and screw 31 shown in connection with the slide 19 in Figs. 2 and 6. The arms 79 are provided with the slots 89 inclined symmetrically to the vertical and diverging upwardly. It is apparent that if the slide 81 (Fig. 6) is drawn downward the action of the slots will be to wedge the rolls 77 apart and consequently the slide members 63 and 65 and the jaws 59 and 61 carried thereby, and if, on the contrary, the slide is moved upwardly the slides and jaws will be brought together. A suitable spring 91 (Fig. 6) is provided which normally holds the slide 81 in elevated position and consequently tends to keep the jaws closed. The slide is moved in the opposite direction to open the jaws by means of the roll 93 fixed thereon and projecting through a slot 95 in the guide or bearing 83 and cooperating with the lever 97 pivoted at 99 to the main standard 25 of the head and actuated by cam 101 on shaft 5. As the inward movement of the jaws is effected by the spring 91, it is apparent that provision is made for variations in the size of the buttons clamped between them. The timing and action of these jaws relative to the other parts of the mechanism will be later explained.

I will now describe the devices which take hold of the button in the front and rear and will refer particularly to Figs. 2, 7 and 8. The button is engaged at the front nearer the drill by a fixed block 103 supported on the plate 25 and perforated at 105 to permit the passage of the drill therethrough (see Fig. 8). The button is held against the block 103 by a movable abutment jaw 107 which is here shown mounted on a lever 109 swinging on the vertical journal 111 (see Fig. 8). A suitable spring 113 is provided which normally rocks the lever 109 contra-clockwise (Fig. 8) to move the jaw 107 out of clamping position. To actuate the jaw in the opposite direction a suitable, horizontal slide 114 is provided which carries a part 115, conveniently in the form of a roll as shown, (Fig. 8) in order to reduce friction, which will act like a wedge on one arm of the lever 109 and swing the jaw 107 into clamping position. The slide may be actuated in any suitable manner, but I have here shown a lever 117 mounted on the bracket 119 which may be integral with pivot stud 53 and connected by a link 121 with the lever 51 above mentioned. A resilient rod 123 may be mounted in a suitable stud 125 on the lever 117 and is engaged between two small rolls 127 mounted on the slide 114. When the lever 51 is rocked by the cam, the lever 117 will also be rocked and the slide will be actuated by the rod 123 to move the jaw carrying lever 109 against the force of the spring 113. The resiliency or flexibility of the rod 123 permits a certain amount of lost motion to take place and so the chuck is accommodated to any variations in length of the button held by it.

I will next describe the action of the feeder arm 15 and thereafter will be able to coordinate the descriptions of the various parts of the mechanism hereinbefore set forth in detail. The action of the feeder arm is best illustrated by Figs. 7 and 13. The arm 15 is pivoted between its ends at 129 on a slide member comprising the two parts 131 and 133, relatively adjustable by means of set screw 135 to compensate for wear but which move vertically as one piece. The slide member moves in a vertical guide 137 and is normally held in its uppermost position by means of a spring 139. The slide carries a roll 141 projecting through a slot 143 in the guide and cooperating with lever 145 pivoted on bracket 147 and actuated by cam 149. When the slide is held in its uppermost position by means of the spring 139, the bifurcated end of the feeder arm is in the position shown in Fig. 2, above the axial line of the drill about which the lateral holding jaws 21 and 23, 59 and 61 converge. When the cam 149 rocks the lever 145 to depress the slide, the end of the arm is moved into the position shown in full lines in Fig. 13 to bring the button which it carries into alinement with the drill and into position to be received by the holding parts of the chuck mechanism.

Referring now to Figs. 2, 3 and 13, I will describe the means by which the arm is caused to release one button and return to receive the succeeding one. For this purpose a spring 151 is provided which normally swings the arm so that its bifurcated end is in the line of the descending series of buttons in the chute 2 as shown in full lines in both of the figures. A small lever 153 (see Fig. 3) is pivoted on the stud which carries the roll 141 and is adapted to engage the pin 155 on the upper end of the feeder arm 15. When the arm has descended under the influence of the lever 145 to the full line position of Fig. 13, the lever 153 is rocked to swing the arm 15 against the force of the spring 151 to the dotted line position shown. This may be accomplished in any suitable way, but I here show the link 157 and lever 159 pivoted at 161 on the bracket 119 and cooperating with a suitable cam 163 on the shaft 5.

Referring to Figs. 7 and 8, it will be seen that the upper jaw or finger 21 is rabbetted and the right hand, lateral jaw 61 is slotted to permit the passage of the feeder arm 15.

I will next briefly describe the cycle of motion of the parts which have previously been described in detail, and for this purpose will refer to the diagrammatic view in Fig. 13 and to Fig. 8. Suppose the cam 149 to have swung the lever 145 thereby to depress the feeder arm 15 carrying the button in its bifurcated end to the full line position shown in Fig. 13, which is approximately in alinement with the drill. At this moment the cam 49 releases the lever 45 and permits the slide 19 to move to the right under the action of the spring 33, and the inclined surfaces of the two fingers 21 and 23 ride along the sides of the button, receiving the same from the arm 15, and not only support it but by virtue of their symmetrical arrangement center it about the horizontal. At about the same time the cam 101 releases the lever 97 and permits the spring 91 (Fig. 6) to move the slide 81 upwardly so that the inclined slots in the arm 79 will move the two slides 63 and 65 inwardly and bring the jaws 59 and 61 into clamping engagement with the sides of the button. Because of the symmetrical arrangement of the two arms 79 and the fact that they take their motion from the same member, their effect will be to center the button about the vertical. As the spring 33 draws the slide 19 to the right, it will rock the lever 45, and through the link 55, lever 51 and link 121 rock in a contraclockwise direction the link 117 (see Fig. 2). Through the arm 123 the slide 114 (Fig. 8) will be forced to the right and the roll 115 will swing the jaw-carrying lever 109 on its pivot and clamp the jaw yieldingly against the button to press it against the block 103.

As the fingers 21 and 23 move to the right the cam 163 comes into play to rock the lever 153 shown in Fig. 3, whereby to withdraw the feeder arm 15 to the dotted line position shown in Fig. 13. When the arm was so withdrawn and while the finger 21 upheld the succeeding button in the chute 2, the cam 149 released lever 145 and permitted the spring 139 to retract the feeder arm to an elevated position, whereupon the cam 163 releases the same to the action of the spring 151 and permits the arm to swing into the position shown in Fig. 2 to engage with its bifurcated end the next button descending the chute.

Figure 10:
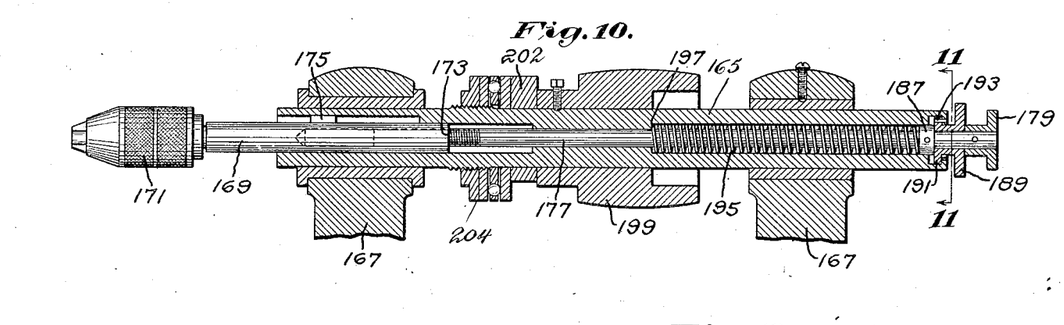
Fig. 10 is a central, longitudinal section through the drilling mechanism proper.
Figure 11:
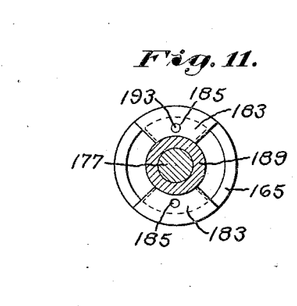
Fig. 11 is a section on line 11—11 of Fig. 10 on a larger scale.
Figure 12:
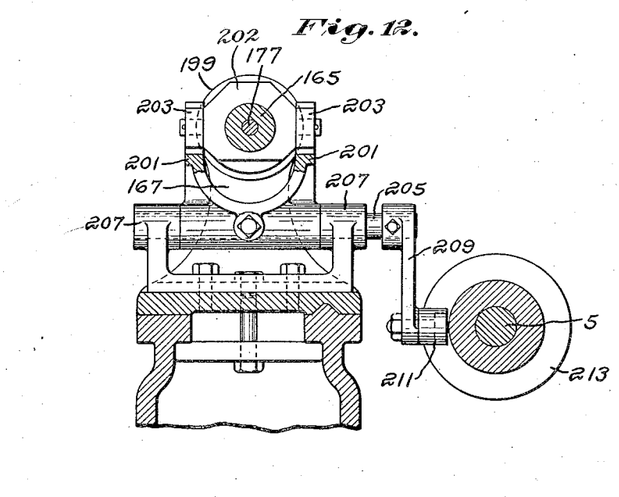
Fig. 12 is a section on the line 12—12 of Fig. 1.
Figure 14:
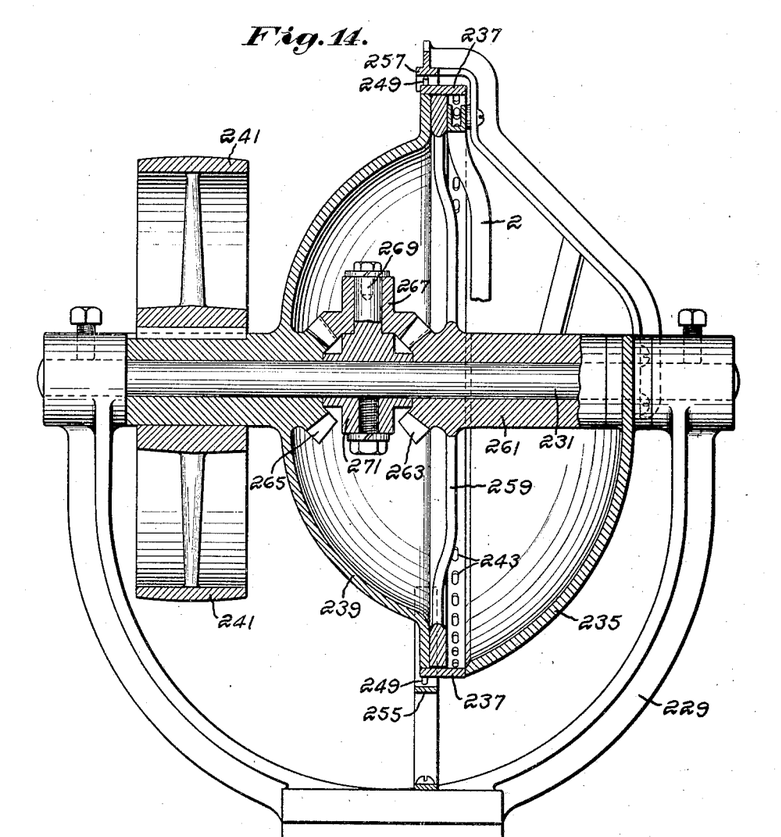
Fig. 14 is a section on the line 14—14 of Fig. 1.

I will next describe the construction of the form of drilling mechanism 4 shown herein and in doing so will refer more particularly to Figs. 10, 11 and 12. This mechanism extends transversely to the plane of the lateral clamping jaws in the head 3 and includes an outer tubular shaft or sleeve 165 slidably and rotatably mounted in aligned bearings in two plummer blocks 167. In the end of the sleeve 165 nearer to the head 3 is mounted a rod 169 carrying the drill chuck 171 and having the threaded opening 173 at its other end. This rod is secured within the sleeve 165 by means of the groove and feather 175 (Fig. 10) to rotate therewith. A threaded rod 177 passes through the sleeve 165 from the end further from the head 3 and enters the hole 173. The rod is provided with a suitable head or handle 179 on its extremity and it is apparent that by turning this handle the rod 169 will be moved longitudinally, guided by the groove and feather, and consequently the position of the chuck 171 with respect to the head 3 varied.

It will be remembered that the head 3 is fixed in position on the frame of the machine. Therefore it is desirable and even necessary to provide some means whereby the chuck 171 may be drawn away from the head to permit the drill 181 to be readily mounted and dismounted. For this purpose the rod 169 and cooperating rod 177 which sustain the chuck are made movable with respect to the sleeve 165 and locking means may be provided for holding them in forwardly adjusted position. In the present instance the sleeve 165 is provided at the end further from the chuck with the inturned sector-shaped flanges 183 corresponding to opposite quadrants of the cross-section of the sleeve. These flanges are provided with suitable apertures 185. The rod 177 has mounted rotatably therein, for example, between the collar 187 and the handle 179, a sleeve 189 provided at one end with the outwardly projecting flanges 191 corresponding more or less in shape to the flanges 183 and from which project the pins 193. It is apparent that when the sleeve 189 is turned to cause the flanges 191 to register with the spaces between the flanges 183, that the rod 177 may be withdrawn to the right in Fig. 10 and the chuck 171 consequently be brought to a considerable distance from the head 3 whereby the drill 181 can be easily replaced. When it is desired to bring the drill into working position the sleeve 189 and consequently the rod which carries it is again moved to the left and the sleeve is turned so that the flanges 191 lie behind the flanges 183 and the pins 193 enter the perforations 185. To lock the sleeve in this position a spring is preferably provided, here shown as a helical spring 195 encircling the rod 177 and bearing against the collar 187 and a suitable shoulder 197 in the interior of the sleeve.

Suitable mechanism is provided to actuate the drill of which an example is shown most clearly in Figs. 1, 9 and 12. A pulley 199 is mounted on the sleeve 165 by means of which rotative movement is applied thereto and, because of the feather connection at 175, to the chuck and drill. To give the drill forward feeding movement and to retract it from the hole which it had made at proper times, a suitable yoked lever 201 is provided having bifurcated arms cooperating with the bearing blocks 203 which are pivoted to the collar 202 mounted on sleeve 165 between pulley 199 and the nut 204. As best shown in Fig. 12 this yoke may be secured to the rock-shaft 205 mounted in journal brackets 207 projecting from the frame of the machine, which rock-shaft is provided with a crank-arm 209 carrying the cam roll 211 cooperating with the groove cam 213 mounted on shaft 5. It is apparent that, as the cam 213 rocks the shaft 205, the lever 201 will be rocked and through the bearing blocks 203 will give the sleeve and the drill carried thereby translatory movement in its bearings in the plummer-blocks 167.

Referring particularly to Fig. 9 wherein the form of the cam groove is indicated, the roll is shown in that figure in the position it takes when the drill is just beginning to cut. The shaft 5 is rotating toward the reader. The drill is fed forward gradually by the slightly spiral part 215 of the cam groove until the hole has reached the proper depth when the shoulder 217 comes into play and with a sharp quick movement retracts the drill clear of the hole. The drill is now held by the straight part 219 of the cam groove substantially at rest while the clamping mechanism on the head releases the drilled button and takes hold upon another button presented thereto by the feed arm 15. When the second button is clamped in position, the drill is quickly moved forward by the part 221 of the cam groove to the face of the work and then is once again given its gradual feeding movement by the part 215 of this groove.

If desired suitable means may be provided for automatically stopping the machine if anything goes wrong in the feeding of the buttons. I have illustrated in Fig. 9 a suitable mechanism for accomplishing this purpose which, in the present case, embodies the lever 223 pivoted on the frame of the machine and having the bent end 225 which, when the lever is in the position shown in that figure, projects into the path of the slide 19. It will be remembered that in this figure the drill is just beginning to cut and that therefore the slide 19 is in its innermost clamping position. The other end of the lever carries a suitable cam roll cooperating with the groove cam 227 which is mounted on the hub of the pulley 7. As long as the machine continues in normal operation, the part of the cam track in which the cam roll is shown lying in Fig. 9, will act to move the end 225 of the lever in behind the slide 19 when the latter is moved inwardly. However, if anything goes wrong with the mechanism because the buttons are not properly fed or because something has jammed the holding jaws and the slide 19 is held outwardly, it will project into the path of the bent end 225 and hold the lever. The cam 227 now becomes a driven instead of a driving member and the hub carrying it and the pulley 7 will be moved toward the left in Fig. 9 to disengage the clutch 8 and stop the machine.

The buttons may be delivered to the head 3 in any suitable manner; if desired by feeding them by hand into a suitable chute 2 such as is shown. I prefer, however, to employ an automatic mechanism for assorting buttons from a bulk thereof and delivering them in proper position to the chute. One suitable mechanism for this purpose is illustrated in Figs. 1 and 14 to 16. The assorting mechanism which is denoted generally by the reference numeral 1 is here shown as mounted on a suitable standard 229 having arms connected by the rod 231 which provides a journal bearing. In the form of mechanism here shown a suitable hopper or container is provided to receive a number of buttons to be assorted and delivered to the head 3 which hopper may be formed of the substantially semi-circular, fixed, dished plate 235 cooperating with the flange 237 of the dished disk wheel 239 which forms the other side of the hopper. The flange 237 acts also as a circulating conveyer mechanism for the buttons. To drive this mechanism the hub of the wheel is journaled on the rod 231 and may be driven by any suitable power by the pulley 241. The rim or flange 237 of the wheel is provided with suitable pockets 243 (see Figs. 15 and 16) opening inwardly toward the center thereof and consequently to the inside of the hopper and shaped in such fashion as to permit the entrance of the buttons in one position only. It is apparent that as the wheel rotates beneath the mass of buttons that certain ones will enter those pockets which are near the bottom thereof.

Figure 15:
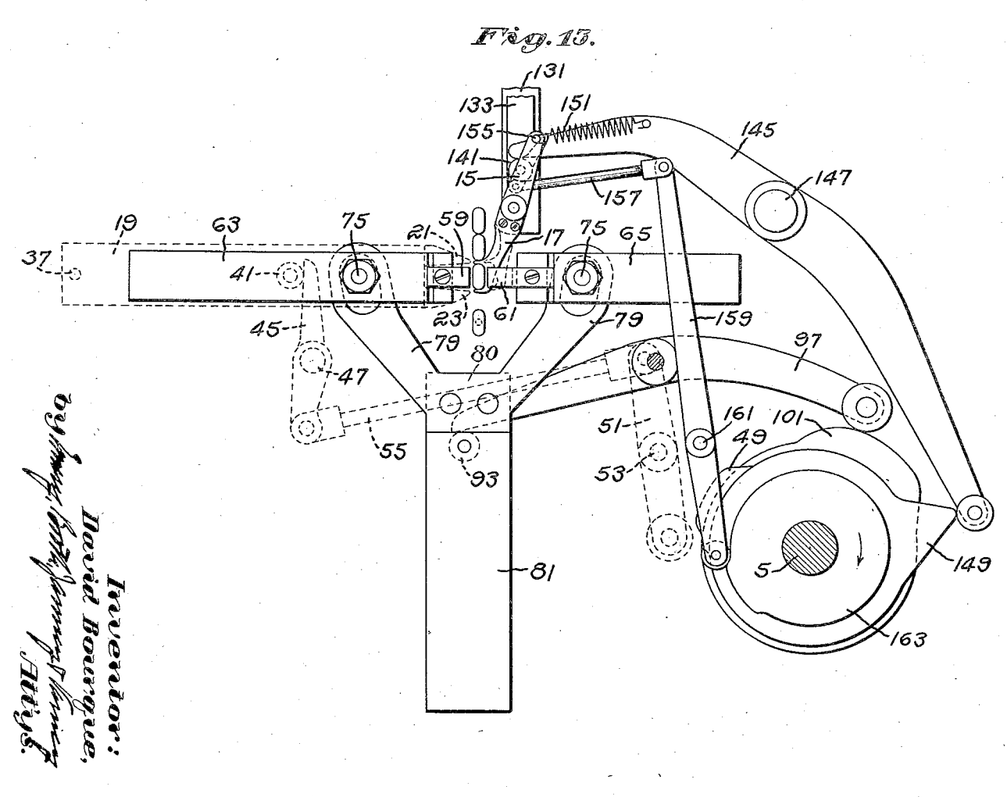
Fig. 15 is a section through the rim of the carrier wheel in Fig. 14 taken along a radius thereof.
Figure 16:
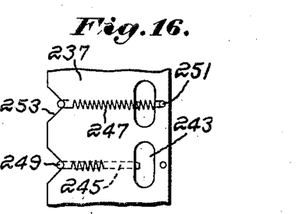
Fig. 16 is a plan view of a portion of the rim of said wheel.
Figure 17:
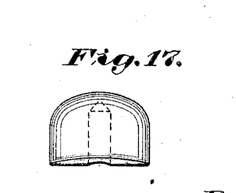
Fig. 17 is a side elevation of one of the heads or buttons after it has been drilled.

In order to retain the buttons in the pockets after they have entered the same, suitable gripping means are provided which may be in the form of spring pressed catches as here shown. These catches may, as illustrated, consist of bent wires having one leg 245 passed through transverse holes in the rim 237 of the wheel which severally communicate with the openings 243. It is apparent that if the leg 245 is moved toward the right viewing Fig. 15 by any suitable means such, for example, as the spring 247 stretched between the other leg 249 of the catch and the fixed pin 251, that it will reduce the effective size of the pockets 243 and securely retain in place the buttons which may have entered the same. The legs 249 of these catches are disposed in V-shaped notches 251 in the rim of the wheel the sides of which serve as wedge surfaces, as will hereinafter be explained, and they project outwardly from the center of the wheel. As seen in Fig. 16 the springs will normally retain the legs 249 in central position in the notches 253.

It is apparent that if the leg 245 of the spring catch always projected into the pocket 243 that the buttons could not enter the same. A suitable cam surface or track 255, best shown in Fig. 1, is provided to release these catches adjacent the lower part of the wheel to permit the buttons in the hopper to enter the recesses by gravity. This cam surface 255 is simply an arc shaped plate projecting into the path of the outwardly extending legs 249 of the catches so that, as the wheel turns, the legs are engaged thereby as shown in Fig. 1 and rocked along the side of the notches 253 which will act as wedges to draw the catches longitudinally against the action of the springs 247 and permit the buttons to enter the pockets 243 without obstruction. When, in the clockwise rotation of the wheel viewing Fig. 1, the part of the rim carrying any given pocket passes the left hand end of the surface 255, the catch will be released to the action of the spring and the leg 245 pressed against the button in the pocket as shown in Fig. 15, which will, therefore, be securely held in place against gravity and raised to the position shown at the top of Fig. 1 adjacent the intake end of the chute 2. Adjacent this end of the chute a trip in the form of another cam surface 257 similar to the surface 255 is provided which rocks the legs 249 of the catches in the same way. By this means the buttons are released to the action of gravity just as they are presented to the intake end of the chute 2 and are therefore delivered to such chute in proper position to be taken hold of by the feeding arm 15 when delivered to the head 3. This is the case because the pockets 243 are of such shape as to permit the entrance of the buttons in one position only and consequently all the buttons raised by the carrier or wheel are arranged in the same way.

In order to keep in motion the mass of buttons within the hopper or container formed by the cooperating wheel 239 and the plate 235, a spoked wheel 259 is provided to act as a stirrer and this wheel preferably is rotated in a direction opposite to that of the wheel 239. The wheel 259 may have a hub 261 mounted on the supporting rod 231 and carrying a miter gear 263 taking motion from miter gear 265 on the hub of the driven wheel 239 through an idle gear 267 mounted for rotation on the post 269 projected from sleeve 271 which is non-rotatably secured on the rod 231.

I will now briefly recapitulate the action of the machine, referring to earlier descriptions for the details. Viewing Fig. 1, the machine is started and a number of undrilled buttons placed within the container formed by the wheel 239 and the plate 235. As the wheel rotates the surface 255 holds the catches free from those pockets near the bottom of the wheel and certain of the buttons which are constantly being tumbled about by the action of the wheel 239 and the stirring wheel 259 will enter the same. Because of the formation of the pockets the buttons received thereby are all positioned in one way. As the pocket carrying the button moves past the end of the cam surface the catch is released to the action of the spring 247 and the leg 245 thereof is pressed against the side of the button and holds the same until it reaches to a point adjacent the cam surface 257. Here the leg of the catch is withdrawn from the pocket and allowed to fall therefrom into the chute 2. The buttons are thus automatically delivered in proper position to the chute through which they pass by gravity to the position shown in Fig. 2 where they come under the action of the feeder arm 15. I refer to the two paragraphs beginning: "I will next briefly describe the cycle of motion" for a detailed description of the action of the feeder arm which delivers the buttons seriatim or one after another to the action of the holding means, which is essentially a six-jawed chuck holding the button from all sides for the action of the drill thereon. This chuck comprises the forward fixed jaw 103, the back or abutment jaw 107 and two lateral jaws 59 and 61 best shown in Fig. 8 and also two other jaws 21 and 23 which seize the button above and below and are clearly shown in Figs. 2 and 3. The jaws 59 and 61, 21 and 23 all have a movement of approach and recession relative to the axial line of the drilling mechanism and their action is in all cases symmetrical and provision is made by the springs which move the jaws to clamping position to accommodate variations in size of the buttons due to irregularities of manufacture. Because of this symmetrical arrangement and the fact that the opposite jaws of each pair are moved by the same driving means the button is perfectly centered with respect to the drill 181. I refer to the paragraph beginning "Referring particularly to Fig. 9" for a description of the motion of the drill as coordinated with the motion of the clamping means of the head 3.

In Figs. 1 and 8 there will be seen a funnel-shaped guard 273 extending around the point of the drill. The purpose of this guard is to prevent the shavings from the boring operation from falling into the mechanism of the holding chuck.

As the bored buttons are released from the holding mechanism they drop by gravity into a suitable chute 275 shown in Fig. 1 but omitted for clearness from the other figures and are carried thereby to any suitable receptacle.

It is apparent from the description given of one form of machine embodying the principles of my invention that I provide for rapid handling of such articles as the buttons or heads of curtain fasteners and for an accurate working of the same by a drill or like tool. Because of the number of parts involved I have described in detail the particular construction of machine here illustrated and have used specific words in referring to the various mechanical parts. It will be understood, however, that I have done this in order that the structure and operation of the embodiment of my invention might be more readily comprehended and not because the details disclosed are of the essence of the invention.

What I do claim and desire to secure by Letters Patent is:

1. A machine of the class described comprising in combination with an axially moving drill means to feed articles one by one into axial alignment with said drill and article holding means presenting more than two article engaging faces symmetrically arranged about the axial line of the drill and means for positively moving said holding means in both directions to cause said faces to approach and recede from said axial line whereby to grip and center successive articles for operation of the drill thereon.

2. A machine of the class described comprising in combination with an axially moving drill an abutment movable to a position in axial alignment with said drill, means to feed articles seriatim to a position which is in front of the abutment when so located, and article supporting means presenting opposed pairs of article engaging faces and means independently operating for each pair of article engaging faces for moving said supporting means effective to cause opposite faces to advance and recede in equal amounts and opposite senses toward and from said axial line whereby to grip and center successive articles for operation of the drill thereon.

3. In a drilling machine the combination with an axially moving drill, means for feeding the work to the drilling position, a pair of jaws movable to and from the axial line of the drill and from opposite sides thereof to grip and hold the work and independently operating centering fingers movable substantially parallel to and in timed relation to one of said jaws to center the work in drilling position to be gripped by said jaws.

4. In a drilling machine the combination as described in claim 3 together with an abutment rearward of the jaws movable to support the work held by the jaws against the action of the drill.

5. A machine of the class described comprising in combination, a frame, a sleeve mounted thereon for both rotary and translative feeding movement, a shaft slidably mounted in said sleeve to rotate therewith, a tool chuck carried by said shaft, a fixed work-holding head carried by said frame in alignment with said shaft and means to fix said shaft against sliding movement in said sleeve.

6. A machine of the class described comprising in combination, a frame, a sleeve mounted thereon for both rotary and translative feeding movement, a shaft slidably mounted in said sleeve to rotate therewith, a tool chuck carried by said shaft, a fixed work-holding head carried by said frame in alignment with said shaft, a spring acting on said shaft and tending to move said chuck away from said head and means to lock said shaft against the force of said spring.

7. A machine of the class described comprising in combination, a frame, a sleeve mounted thereon for both rotary and translative feeding movement, a shaft slidably mounted in said sleeve to rotate therewith, a tool chuck carried by said shaft, a fixed work-holding head carried by said frame in alignment with said shaft and means to fix said shaft against sliding movement in said sleeve comprising a spring pressed collar coaxial with said sleeve, relatively movable longitudinally thereof in one position of angular adjustment and interlocking therewith in another position.

8. In a drilling machine the combination with an axially moving drill, a work holding mechanism presenting work engaging faces symmetrically on opposite sides of the axial line, a second work holding mechanism presenting work engaging faces symmetrically above and below said line and means for moving said mechanisms to bring said faces alternately nearer and farther from said line in equal and opposite amounts.

9. In a drilling machine the combination with an axially moving drill, a work holding mechanism presenting work engaging faces symmetrically on opposite sides of the axial line, a second work holding mechanism presenting work engaging faces symmetrically above and below said line and a single member transmitting motion to each said mechanism moving the same to bring said faces alternately nearer and farther from said line in equal and opposite amounts.

10. In a drilling machine the combination with an axially moving drill, a work holding mechanism presenting work engaging faces symmetrically on opposite sides of the axial line, a second work holding mechanism presenting work engaging faces symmetrically above and below said line and separate yielding means giving motion to each said mechanism, moving the same to bring said faces alternately nearer and farther from said line in equal and opposite amounts.

11. A machine of the class described comprising a drill, means to feed articles one by one into axial alignment with said drill, a slide member 19 reciprocating in a plane transverse to said drill and having fingers presenting article engaging faces oppositely and equally inclined with respect to a line extending in the direction of motion of said slide and intersecting the axial line of the drill, opposed jaws to seize the articles at a location different from that of said fingers and means to actuate said slide and jaws.

12. A machine of the class described comprising a tool, a system of jaws for holding an article for operation of said tool thereon, means to actuate the same, a supply passage leading toward the centre of said system and a feeding device for delivering articles from said passage to said jaws comprising an arm having an end formed to embrace an article presented in said passage and means to reciprocate said arm to carry said end to and from the centre of said system and means to rock the same substantially in alternation with the reciprocating movements to cause release of one article to the action of said jaws and prehension of another presented in said passage.

13. A machine of the class described comprising a centric group of jaws for supporting an article by its sides and providing for access of a tool to an end thereof, a supply passage leading to the centre of the group, a transfer device 17 to transfer articles from the passage to the centre of the group and operating substantially in the plane of the jaw, certain of the jaws being cut away to pass the transfer device whereby to permit continuous control of an article by device and jaws successively.

14. A machine of the class described comprising a centric group of jaws for supporting an article by its sides and providing for access of a tool to an end thereof, a supply passage leading to the centre of the group, a transfer device 17 to transfer articles from the passage to the center of the group and having a four motion feed substantially in the plane of the jaw, certain of the jaws being cut away to pass the transfer device whereby to permit continuous control of an article by device and jaw successively.

15. A machine of the class described comprising a drill, means to feed articles one by one into axial alignment therewith, slide members presenting axial holding jaws symmetrically about said line, a sliding mechanism having oppositely inclined slots cooperating with said slide members to move the same on actuation thereof and means for reciprocating said mechanism.

16. A machine of the class described comprising a drill, means to feed articles one by one into axial alignment therewith, slide members presenting axial holding jaws symmetrically about said line, a sliding mechanism having oppositely inclined slots cooperating with said slide members to move the same on actuation thereof, yielding means for moving said mechanism to close said jaws and other means for moving the same in the opposite direction.

17. The supply mechanism comprising a container for articles in bulk, a conveyor movable through said container and having pockets therein to receive articles from said bulk, means to grip articles in said pockets and means to render said gripping means ineffectual at that portion of the path of the conveyor extending through the container and at a point exterior to the container.

18. The supply mechanism comprising a container for articles in bulk, a conveyor movable through said container and having pockets therein to receive articles from said bulk, means to grip articles in said pockets effective throughout a portion of the path of the conveyor exterior to the container.

19. A machine of the class described including a shaft, a driving pulley therefor and clutch means for connecting said pulley and shaft, mechanism actuated from said shaft, a lever and means movable with said pulley cooperating with one end of said lever to move the some substantially longitudinally of the shaft and to move the other end thereof in to and out from the path of said mechanism.

20. The supply mechanism comprising a container for articles in bulk, a conveyor movable through said container and having pockets arranged to receive articles only when presented thereto in a given position, means to grip articles in said pockets, means to render said gripping means ineffectual within said container and means exterior of the container for releasing the same serially with reference to the several pockets.

21. The supply mechanism comprising a container for articles in bulk, a circulating conveyor movable through said container and having pockets arranged to receive articles only when presented thereto in a given position, means to grip articles in said pockets and means to render said gripping means ineffectual at that portion of the path of the conveyor extending through the container and at a point exterior to the container.

22. The supply mechanism comprising a container for articles in bulk, a conveyor movable through said container and having pockets arranged to receive articles only when presented thereto in a given position, devices acting to reduce the effective size of said pockets whereby to retain articles therein and means to render said devices ineffectual within the container and at a point exterior thereto.

23. The supply mechanism comprising a container for articles, a wheel with its lower part disposed in said container and having inwardly opening pockets in its rim, spring-pressed catches extending from the walls of said pockets, a track adjacent the lower part of the wheel bearing on said catches and acting to move them clear of said pockets against the action of said springs, a chute leading from the inner periphery of the wheel and a trip adjacent said chute to release the catches as the pockets are presented to said chute.

24. The supply mechanism comprising a wheel which includes a rim having pockets adapted to receive articles from the interior side, said rim having notches aligned with said pockets and having inclined sides, spring-pressed catches extending into said pockets having legs extending outwardly from the rim and disposed in said notches and means to rock said legs along said inclined sides against the force of said springs at selected points along the path of the wheel.

25. The supply mechanism comprising a rotatable disk wheel having a rim formed with inwardly opening pockets, a plate cooperating with said wheel to form a container or hopper, devices acting to reduce the effective size of said pockets whereby to retain articles therein and means to render said devices ineffectual at selected points along the path of the wheel.

26. The supply mechanism comprising a rotatable disk wheel having a rim formed with inwardly opening pockets, a plate cooperating with said wheel to form a container or hopper, devices acting to reduce the effective size of said pockets whereby to retain articles therein, means to render said devices ineffectual at selected points along the path of the wheel and a second spoked wheel having motion different from that of the first through said container.

In testimony whereof, I have signed my name to this specification.

DAVID BOURQUE.